(12) United States Patent
Miyamoto et al.

(10) Patent No.: US 12,006,158 B2
(45) Date of Patent: Jun. 11, 2024

(54) ARTICLE TRANSPORT FACILITY

(71) Applicant: Daifuku Co., Ltd., Osaka (JP)

(72) Inventors: Masaya Miyamoto, Tokyo (JP); Manabu Onayama, Shiga (JP)

(73) Assignee: Daifuku Co., Ltd., Osaka (JP)

( * ) Notice: Subject to any disclaimer, the term of this patent is extended or adjusted under 35 U.S.C. 154(b) by 199 days.

(21) Appl. No.: 17/639,491

(22) PCT Filed: May 21, 2020

(86) PCT No.: PCT/JP2020/020065
§ 371 (c)(1),
(2) Date: Mar. 1, 2022

(87) PCT Pub. No.: WO2021/044674
PCT Pub. Date: Mar. 11, 2021

(65) Prior Publication Data
US 2022/0324656 A1    Oct. 13, 2022

(30) Foreign Application Priority Data

Sep. 2, 2019 (JP) .................. 2019-159677

(51) Int. Cl.
*B65G 43/08* (2006.01)
*B65G 1/137* (2006.01)
*B65G 15/24* (2006.01)
*B65G 21/12* (2006.01)

(52) U.S. Cl.
CPC ............. *B65G 43/08* (2013.01); *B65G 1/137* (2013.01); *B65G 15/24* (2013.01); *B65G 21/12* (2013.01); *B65G 2201/02* (2013.01); *B65G 2203/0208* (2013.01); *B65G 2203/042* (2013.01)

(58) Field of Classification Search
CPC ........ B65G 43/08; B65G 1/137; B65G 21/12; B65G 2201/02; B65G 2203/0208; B65G 2203/042; B65G 1/1371; B65G 47/642; B65G 21/10; B65G 2203/046; B65G 15/22; B65G 15/24; B65G 15/26
See application file for complete search history.

(56) References Cited

U.S. PATENT DOCUMENTS

| 9,630,035 | B2 * | 4/2017 | Muehlstein ........ B65G 21/2072 |
| 2008/0040246 | A1 | 2/2008 | Fukamachi |
| 2020/0307919 | A1 * | 10/2020 | Mesterheide .......... B65G 15/26 |
| 2022/0289489 | A1 * | 9/2022 | Miyahara ............... B65G 21/14 |

FOREIGN PATENT DOCUMENTS

| JP | 2018193242 A | 12/2018 |
| WO | 2006028086 A1 | 3/2006 |

* cited by examiner

*Primary Examiner* — Mark A Deuble
(74) *Attorney, Agent, or Firm* — The Webb Law Firm

(57) ABSTRACT

A shield gate includes a door member disposed in a gap region located between an intra-area transport unit and an extra-area transport unit in a transport direction in a closed state in which the shield gate shields an opening, and is disposed at a position displaced from the gap region in an open state in which the shield gate opens the opening. A second interval is a length of the gap region that allows the door member to be disposed, during at least a part of a non-transport period, the length of the gap region is set to be greater than or equal to the second interval, and the shield gate is in the closed state, and, during the transport period, the shield gate is in the open state, and the length of the gap region is set to a first interval that is shorter than the second interval.

2 Claims, 6 Drawing Sheets

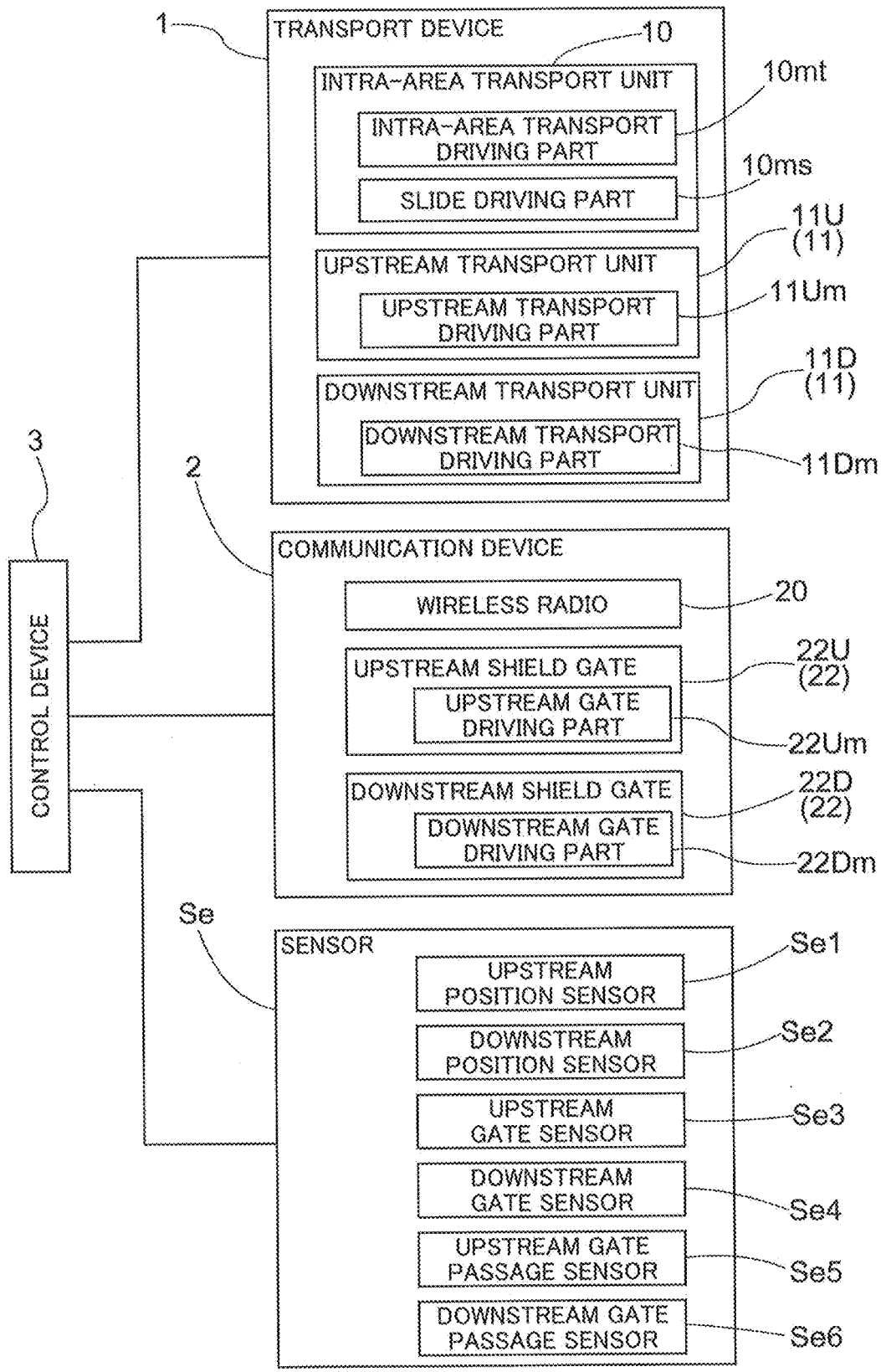

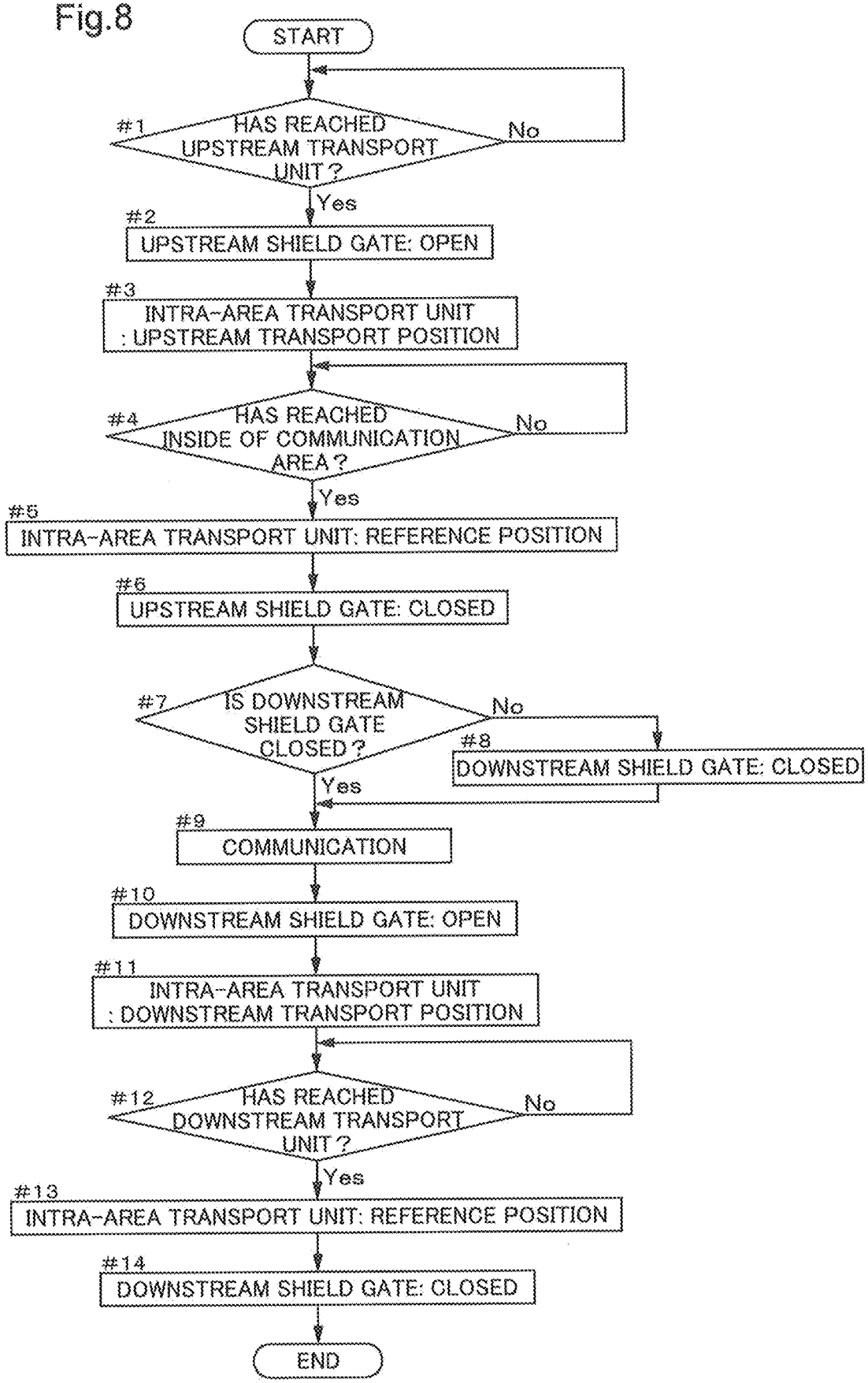

ARTICLE TRANSPORT FACILITY

CROSS-REFERENCE TO RELATED APPLICATIONS

This application is the United States national phase of International Application No. PCT/JP2020/020065 filed May 21, 2020, and claims priority to Japanese Patent Application No. 2019-159677 filed Sep. 2, 2019, the disclosures of which are hereby incorporated by reference in their entirety.

BACKGROUND OF THE INVENTION

Field of the Invention

The present invention relates to an article transport facility including a transport device that transports a target article to which an electronic tag for contactless communication is attached, and a communication device that wirelessly communicates with the electronic tag attached to the target article.

Description of Related Art

For example, WO 2006/028086A (Patent Document 1) discloses a facility that wirelessly communicates with an electronic tag attached to an article while the article is being transported. In the following, the reference numerals shown in parentheses in the description of the background art are those of Patent Document 1.

In the facility disclosed in Patent Document 1, a container (32) is transported by a conveyor line (34) and a transport mechanism (33), as shown in FIGS. 4A to 4C of the document. Also, an IC tag reader covering unit (30) is provided so as to surround the transport mechanism (33) from above, and both directions orthogonal to the transport direction in a plan view. The inside of the IC tag reader covering unit (30) serves as a communication area in which wireless communication with IC tags is performed. A component to which IC tags are attached is housed in the container (32), and the IC tag reader covering unit (30) wirelessly communicates with the IC tags transported by the transport mechanism (33) and passing through the inside of the IC tag reader covering unit (30), and reads information from the IC tags.

The IC tag reader covering unit (30) includes openings respectively formed on upstream and downstream sides of the transport direction and through which the container (32) can pass, and opening/closing shutters (38) that shield and open the respective openings. As a result of the opening/closing shutters (38) being brought into a closed state, each of the opening/closing shutters (38) is disposed between the conveyor line (34) and the transport mechanism (33) in the transport direction, and shield the corresponding opening, thus suppressing leakage of radio waves between the inside and the outside of the IC tag reader covering unit (30). Also, in order to shield the openings by the opening/closing shutters (38), gap regions in which the opening/closing shutters (38) in the closed state are respectively disposed are formed between the conveyor line (34) and the transport mechanism (33) in the transport direction. Thus, in the facility disclosed in Patent Document 1, the transport mechanism (33) that transports the container (32) inside the communication area surrounded by the IC tag reader covering unit (30), and the conveyor line (34) that transports the container (32) outside the communication area are disposed spaced apart from each other in the transport direction by a distance corresponding to the gap regions.

Patent Documents 1: WO 2006/028086A

SUMMARY OF THE INVENTION

An object to be transported by the facility disclosed in Patent Document 1 is a box-shaped container (32) whose bottom surface is formed in a planar shape. Accordingly, in the case where gap regions are formed between the conveyor line (34) and the transport mechanism (33) as described above, the facility can transport the container (32) relatively stably even when the container (32) is transported across the gap regions.

However, for example, in the case where an object to be transported is an article having flexibility such as an object housed in a bag member or an object with an outer jacket formed of a flexible material, a portion of the article may fall in the gap regions, which makes it difficult to stably transport the article across the gap regions. In the case where an object to be transported is an article with a relatively hard outer jacket, it is also difficult to stably transport the article as in the above-described case if the gap regions are too large relative to the size of the article.

Therefore, it is desirable to realize an article transport facility that can stably transport an article at a boundary between the inside and the outside of a communication area.

An article transport facility according to the present disclosure incudes:

a transport device that transports a target article to which an electronic tag for contactless communication is attached, that has a transport surface on which the target article is placeable, and that transports the target article in a predetermined transport direction; and a communication device that is installed in a communication area set at a part of a transport path along which the target article is transported, and that includes a wireless radio that wirelessly communicates with the electronic tag, wherein the transport device includes an intra-area transport unit provided inside the communication area, and an extra-area transport unit provided outside the communication area and disposed next to the intra-area transport unit in the transport direction, the communication device includes: a shield wall installed surrounding the communication area and having at least one opening at a portion thereof corresponding to the transport path; and at least one shield gate that exposes and shields the at least one opening, the at least one shield gate includes a door member configured to be (i) in a gap region between the intra-area transport unit and the extra-area transport unit in the transport direction in a closed state in which the at least one shield gate shields the at least one opening and (ii) outside the gap region in an open state in which the at least one shield gate opens the at least one opening, at least either the intra-area transport unit or the extra-area transport unit is movable in the transport direction, with (i) a second interval being a length of the gap region that allows the door member to be between the intra-area transport unit and the extra-area transport unit, (ii) a transport period being a period during which the target article is transported between the intra-area transport unit and the extra-area transport unit, and (iii) a non-transport period being a period during which the target article is not transported between the intra-area transport unit and the extra-area transport unit, during at least a part of the non-transport period, the gap region has in the transport direction a length greater than or equal to the second interval, and the at least one shield gate is in the closed state, and, during the transport period, the at least one shield gate is in the open state, and the gap region has in the transport direction a length of a first interval shorter than the second interval.

With this configuration, during the transport period during which the target article is transported between the intra-area transport unit and the extra-area transport unit, the length in the transport direction of the gap region located between the intra-area transport unit and the extra-area transport unit is set to the first interval that is shorter than the second interval that allows the door member to be disposed between the intra-area transport unit and the extra-area transport unit. Accordingly, even in the case where the target article is an article having flexibility, or where the second interval is long relative to the size of the article, it is possible to stably transport the target article between the intra-area transport unit and the extra-area transport unit across the gap region having the first interval shorter than the second interval. Thus, it is possible to stably transport the article at the boundary between the inside and the outside of the communication area. With this configuration, during at least a part of the non-transport period, the length in the transport direction of the gap region is set to be greater than or equal to the second interval, and the shield gate is in the closed state. Accordingly, it is possible to ensure a period during which radio waves are less likely to leak between the inside and the outside of the communication area, thus making it possible to favorably perform communication between the communication device and the electronic tag inside the communication area within the ensured period.

Further features and advantages of the technique according to the present disclosure will become apparent from the following description of illustrative and non-limiting embodiments with reference to the drawings.

BRIEF DESCRIPTION OF THE DRAWINGS

FIG. 7 is a control block diagram of the article transport facility.

FIG. 8 is a flowchart illustrating a procedure of control performed in the article transport facility.

DESCRIPTION OF THE INVENTION

Schematic Configuration of Article Transport Facility

An embodiment of the article transport facility will be illustratively described with reference to the drawings.

Figure 1:
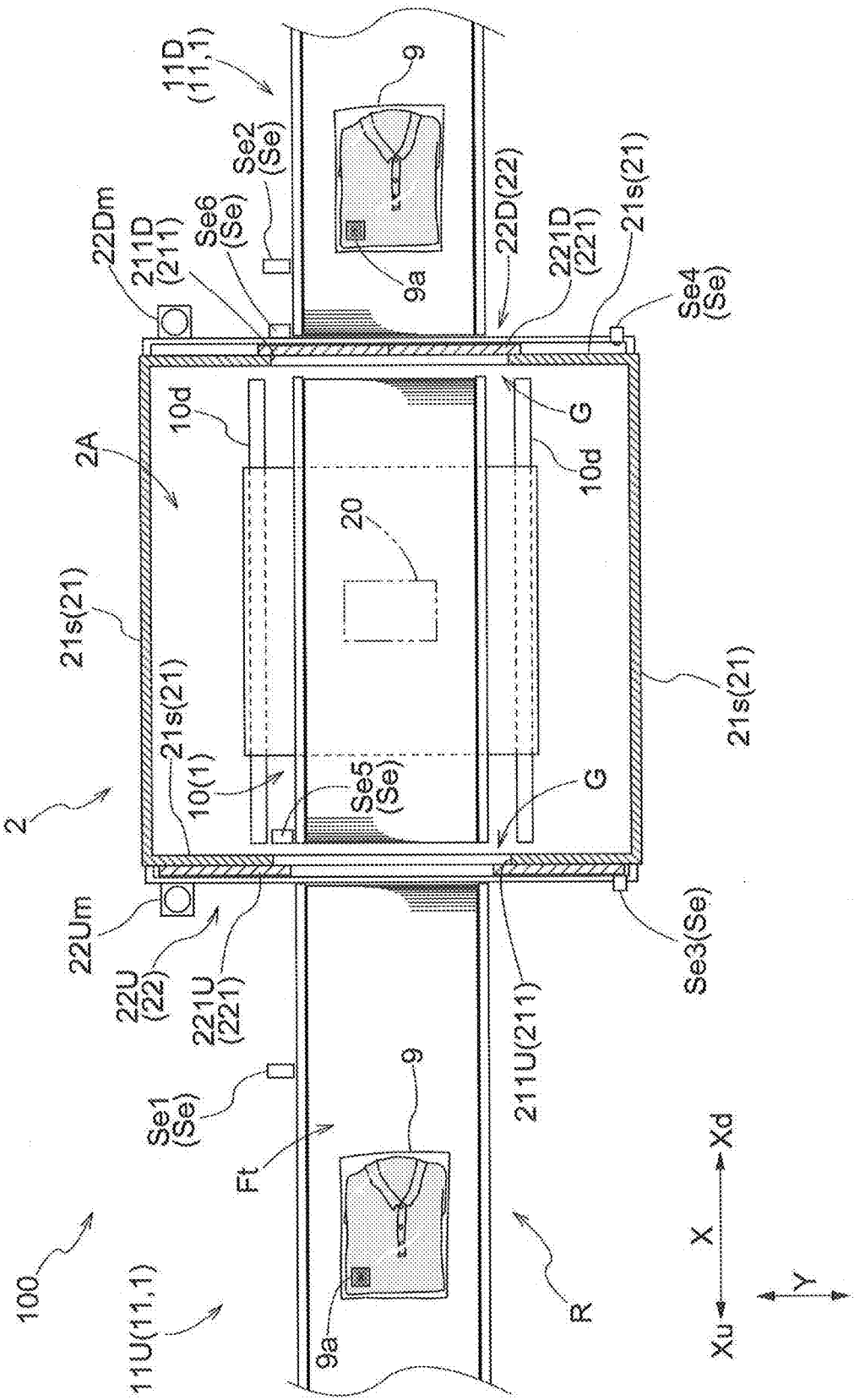
FIG. 1 is a plan view of an article transport facility.
Figure 2:
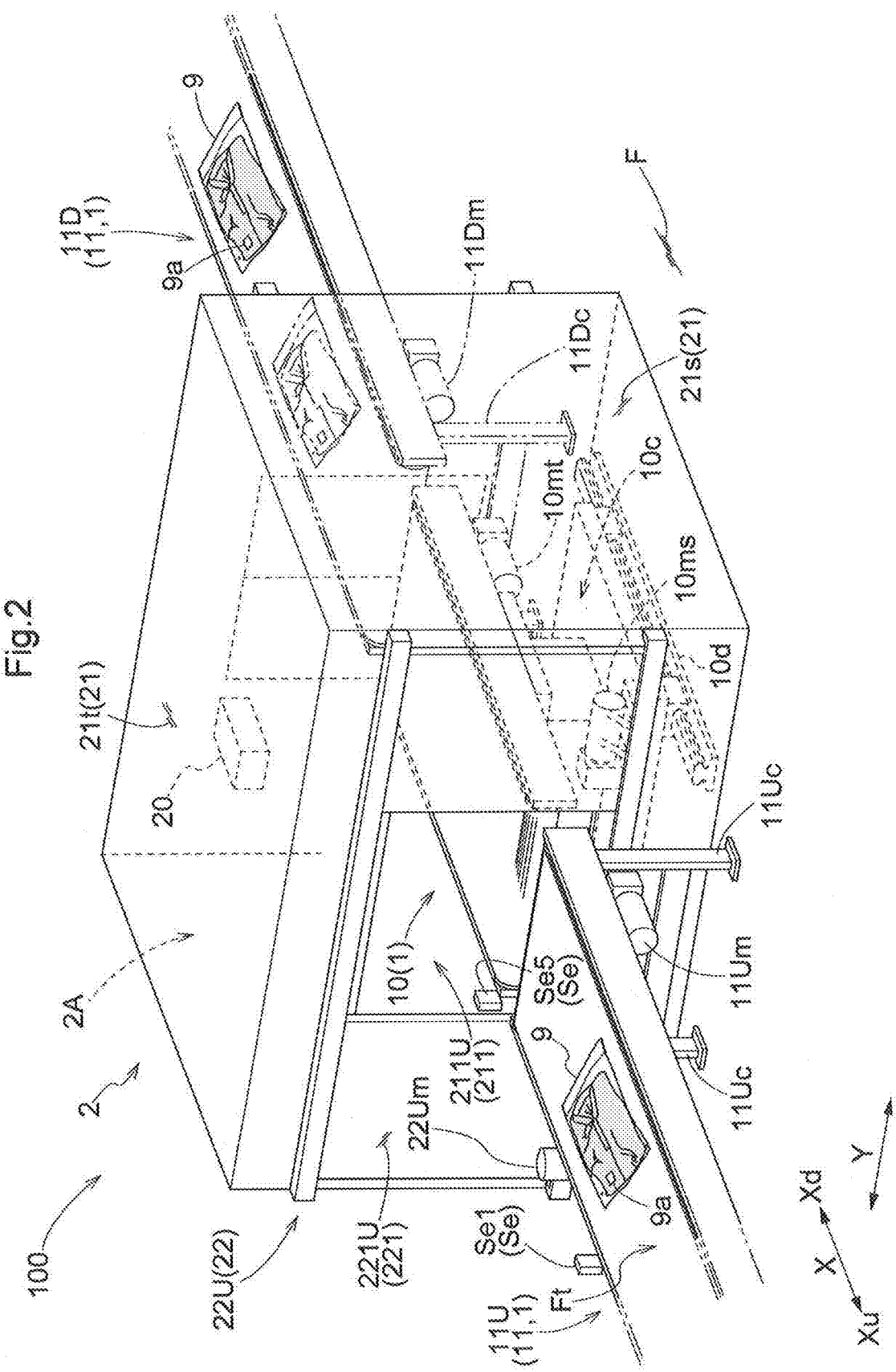
FIG. 2 is a perspective view of the article transport facility.
Figure 3:
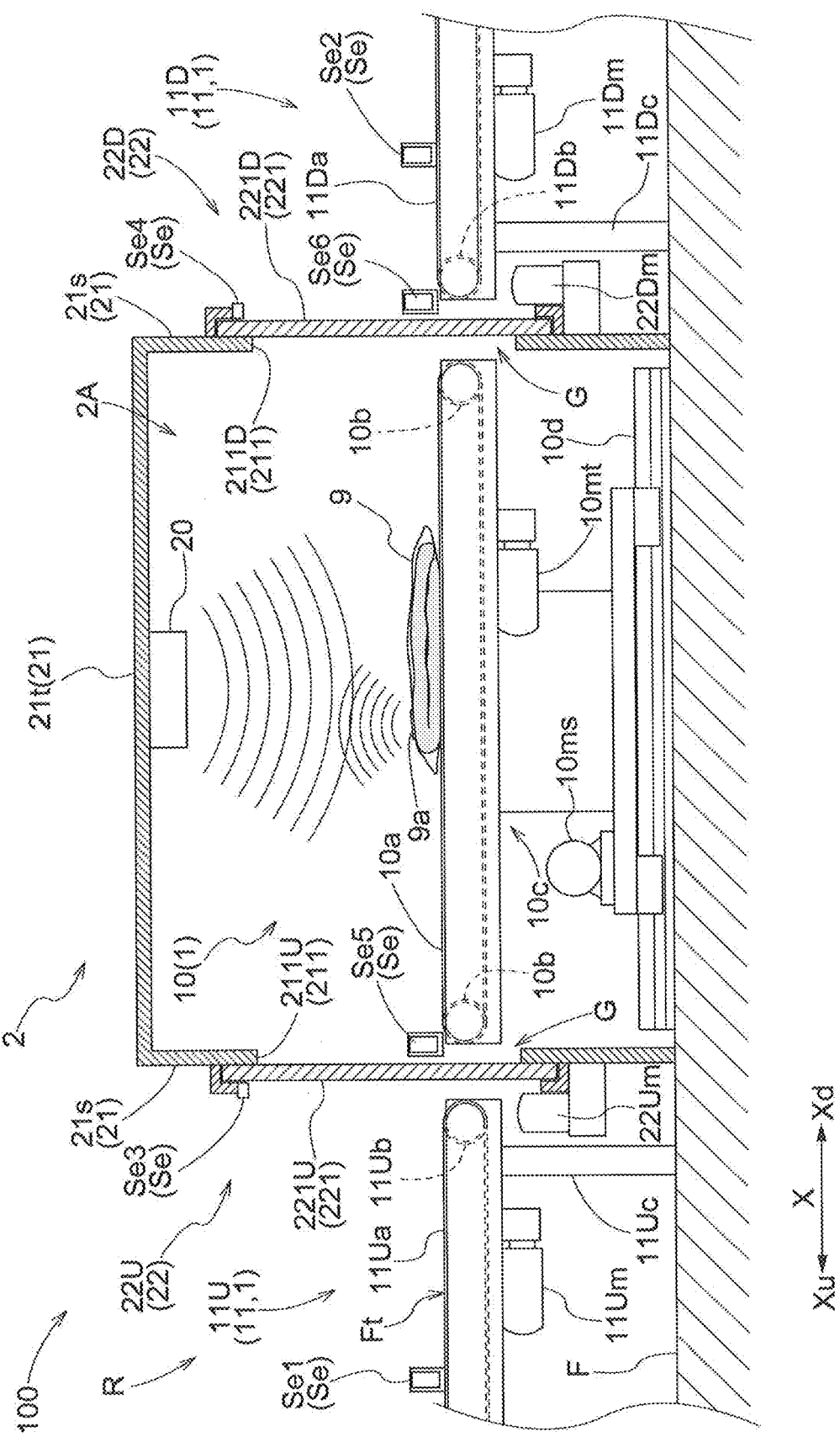
FIG. 3 is a diagram showing the article transport facility as viewed in a width direction thereof.

As shown in FIGS. 1 to 3, an article transport facility 100 includes a transport device 1 that transports, along a predetermined transport direction X, a target article 9 to which an electronic tag 9a for contactless communication is attached, and a communication device 2 including a wireless radio 20 that wirelessly communicates with the electronic tag 9a.

The communication device 2 is installed in a communication area 2A that is set in a part of a transport path R along which the target article 9 is transported. The transport device 1 includes an intra-area transport unit 10 provided inside the communication area 2A, and an extra-area transport unit 11 provided outside the communication area 2A. The intra-area transport unit 10 transports the target article 9 inside the communication area 2A, and the extra-area transport unit 11 transports the target article 9 outside the communication area 2A. In the article transport facility 100, while a target article 9 is being transported by the transport device 1 inside the communication area 2A, the communication device 2 communicates with an electronic tag 9a attached to the target article 9. Note that FIGS. 1 and 2 show a state in which target articles 9 are being transported by the extra-area transport unit 11. FIG. 3 shows a state in which a target article 9 is being transported by the intra-area transport unit 10, and communication is being performed between the communication device 2 and an electronic tag 9a attached to the target article 9.

In the following, the upstream side of the transport direction X is referred to as a transport direction upstream side Xu, and the downstream side of the transport direction X is referred to as a transport direction downstream side Xd. The target article 9 transported by the transport device 1 moves from the transport direction upstream side Xu toward the transport direction downstream side Xd. In the following, a direction orthogonal to the transport direction X in a plan view is referred to as a width direction Y.

In the present embodiment, the communication device 2 communicates with the electronic tag 9a through near field communication. Specifically, the communication device 2 communicates with the electronic tag 9a using an RFID (Radio Frequency Identification) system. In the present example, the electronic tag 9a is configured as an RF tag or an IC tag, and functions as storage medium that electronically stores various types of attribute information regarding the target article 9, including, for example, the product name, type, price, manufacturing date, transport source, transport destination, and the like of the target article 9. In the present embodiment, the communication device 2 reads the information stored in the electronic tag 9a through near field communication. Note that it is also possible to adopt a configuration in which the communication device 2 inputs (writes), deletes, or rewrites the information stored in the electronic tag 9a.

A target article 9 is an article that is to be transported by the transport device 1. Examples of such an article includes a component, a raw material, a work piece, which is an article in process of production, a finished article, which is a completed product, or any of these objects housed in a container, a bag member, or the like. In the present example, a target article 9 is an article including a product in the form of a finished article housed in a bag member as a package. In the illustrated example, each target article 9 includes clothing as a product housed in a transparent packaging bag. However, the target article 9 is not limited to the examples described above, and may be an article including contents housed in a box-shaped container.

In the article transport facility 100 according to the present embodiment, a target article 9 is transported by the transport device 1, and attribute information is read from an electronic tag 9*a* attached to the target article 9 while the target article 9 is being transported. Also, the article transport facility 100 performs, for example, a step such as sorting a plurality of target articles 9 according to the attribute information read from each of the plurality of target articles 9. Although a detailed illustration has been omitted, the transport device 1 transports, to a predetermined transport destination, the target article 9 from which the attribute information of the electronic tag 9*a* has been read. Details of the article transport facility 100 will be described below.

Communication Device

As shown in FIGS. 1 to 3, the communication device 2 is installed in the communication area 2A that is set in a part of the transport path R. The communication device 2 wirelessly communicates with the electronic tag 9*a* attached to the target article 9, using the wireless radio 20. In the present embodiment, the wireless radio 20 is configured as a device for reading the electronic tag 9*a*, and reads the attribute information from the electronic tag 9*a*. The wireless radio 20 includes an antenna (not shown), and communicates, via radio waves, with an antenna (not shown) included in the electronic tag 9*a*.

In the present example, the electronic tag 9*a* is configured as a passive RF tag without a battery. Also, the electronic tag 9*a* generates electromotive force by receiving radio waves from the antenna of the wireless radio 20. Thus, the electronic tag 9*a* emits a signal resulting from encrypting the attribute information to the antenna of the wireless radio 20. The wireless radio 20 reads the attribute information by receiving the signal from the electronic tag 9*a*. However, the electronic tag 9*a* is not limited to such a configuration, and may be configured as an active RF tag including a battery. In this case, the electronic tag 9*a* actively emits the signal to the wireless radio 20.

The communication device 2 includes a shield wall 21 installed so as to surround the communication area 2A and having an opening 211 formed in a portion thereof corresponding to the transport path R, and a shield gate 22 that opens and closes the opening 211.

The shield wall 21 is formed using a material that is less likely to transmit radio waves, including, for example, a metal material. In the present embodiment, the shield wall 21 includes a top wall portion 21*t* disposed above the communication area 2A, and side wall portions 21*s* extending downward from a peripheral edge of the top wall portion 21*t*. The side wall portions 21*s* are provided on both sides in the width direction Y and both sides in the transport direction X of the communication area 2A. In the present example, the side wall portions 21*s* extend from the top wall portion 21*t* to a floor surface F. This can make radio waves less likely to leak between the inside and the outside of the communication area 2A.

In the present embodiment, the opening 211 described above is formed in each of the side wall portions 21*s* provided on both sides in the transport direction X. That is, the opening 211 includes an upstream opening 211U provided on the transport direction upstream side Xu of the communication area 2A, and a downstream opening 211D provided on the transport direction downstream side Xd of the communication area 2A. The upstream opening 211U is formed in the side wall portion 21*s* disposed on the transport direction upstream side Xu of the communication area 2A, and provides communication between the inside and the outside of the communication area 2A on the transport direction upstream side Xu of the communication area 2A. The downstream opening 211D is formed in the side wall portion 21*s* disposed on the transport direction downstream side Xd of the communication area 2A, and provides communication between the inside and the outside of the communication area 2A on the transport direction downstream side Xd of the communication area 2A. In the following description, in the case where the upstream opening 211U and the downstream opening 211D do not need to be distinguished from each other, they are collectively referred to as the "opening 211".

The shield gate 22 includes a door member 221 that is disposed in a gap region G located between the intra-area transport unit 10 and the extra-area transport unit 11 in the transport direction X in a closed state in which the shield gate 22 shields the opening 211, and that is disposed at a position displaced from the gap region G in an open state in which the shield gate 22 opens the opening 211.

The door member 221 is formed using a material that is less likely to transmit radio waves, including, for example, a metal material, as in the case of the shield wall 21. The door member 221 is formed in a plate shape, and is disposed such that the plate thickness direction extends along the transport direction X. In the present embodiment, the door member 221 is configured to move along the width direction Y. More specifically, the door member 221 is formed by a pair of plate-shaped members disposed side by side in the width direction Y, and the pair of plate-shaped members move close to and away from each other along the width direction Y. In the present embodiment, the door member 221 is disposed at a position displaced from the gap region G as a result of the pair of plate-shaped members of the door member 221 moving away from each other along the width direction Y. This brings the shield gate 22 into the open state. The door member 221 is disposed in the gap region G as a result of the pair of plate-shaped members of the door member 221 moving close to each other along the width direction Y. Then, the shield gate 22 is brought into the closed state as a result of the pair of plate-shaped members of the door member 221 abutting against each other.

In the present embodiment, the shield gate 22 includes an upstream shield gate 22U that opens and closes the upstream opening 211U, and a downstream shield gate 22D that opens and closes the downstream opening 211D. In the present example, the upstream shield gate 22U and the downstream shield gate 22D have the same structure. In the following description, in the case where the upstream shield gate 22U and the downstream shield gate 22D do not need to be distinguished from each other, they are collectively referred to as the "shield gate 22".

The door member 221 described above includes an upstream door member 221U included in the upstream shield gate 22U, and a downstream door member 221D included in the downstream shield gate 22D. The upstream door member 221U is disposed in a gap region G on the transport direction upstream side Xu of the communication area 2A in the closed state in which the upstream opening 211U is shielded, and is disposed at a position displaced from the gap region G on the transport direction upstream side Xu of the communication area 2A in the open state in which the upstream opening 211U is open. The downstream door member 221D is disposed in a gap region G on the transport direction downstream side Xd of the communication area 2A in the closed state in which the downstream opening 211D is shielded, and is disposed at a position displaced from the gap region G on the transport direction downstream side Xd of the communication area 2A in the open state in which the downstream opening 211D is open. In the following description, in the case where the upstream door member 221U and the downstream door member 221D do not need to be distinguished from each other, they are collectively referred to as the "door member 221".

Transport Device

The transport device 1 includes a transport surface Ft on which the target article 9 is placed, and transports the target article 9 along the predetermined transport direction X. The target articles 9 is transported by the transport device 1 while being placed on the transport surface Ft.

As described above, the transport device 1 includes the intra-area transport unit 10 provided inside the communication area 2A, and the extra-area transport unit 11 provided outside the communication area 2A and disposed side by side with the intra-area transport unit 10 along the transport direction X.

The intra-area transport unit 10 includes a transport mechanism capable of transporting the target article 9. In the present embodiment, the intra-area transport unit 10 includes a pair of pulleys 10b, and a belt 10a wound around the pair of pulleys 10b, and the pulleys 10b and the belt 10a constitute a transport mechanism. That is, in the present example, the intra-area transport unit 10 is formed by a belt conveyor.

The extra-area transport unit 11 includes a transport mechanism capable of transporting the target article 9. In the present embodiment, the extra-area transport unit 11 includes an upstream transport unit 11U disposed side by side with the intra-area transport unit 10 on the transport direction upstream side Xu, and a downstream transport unit 11D disposed side by side with the intra-area transport unit 10 on the transport direction downstream side Xd. The upstream transport unit 11U and the downstream transport unit 11D each include a pair of pulleys (11Ub or 11Db), and a belt (11Ua or 11Da) wound around the pair of pulleys (11Ub or 11Db). That is, in the present example, both the upstream transport unit 11U and the downstream transport unit 11D are formed by a belt conveyor. In each of the upstream transport unit 11U and the downstream transport unit 11D, the pair of pulleys (11Ub or 11Db) and the belt (11Ua or 11Da) constitute the transport mechanism. Thus, the intra-area transport unit 10, the upstream transport unit 11U, and the downstream transport unit 11D include their respective transport mechanisms that are capable of operating independently of each other. After being transported from the upstream transport unit 11U to the intra-area transport unit 10, the target article 9 is transported from the intra-area transport unit 10 to the downstream transport unit 11D. In the following description, in the case where the upstream transport unit 11U and the downstream transport unit 11D do not need to be distinguished from each other, they are collectively referred to as the "extra-area transport unit 11".

Here, the gap region G is formed between the intra-area transport unit 10 and the extra-area transport unit 11 in the transport direction X, as described above. In the present example, a gap region G is formed between the intra-area transport unit 10 and the upstream transport unit 11U, and between the intra-area transport unit 10 and the downstream transport unit 11D. When the target article 9 is, for example, an article having flexibility such as an object housed in a bag member or an object with an outer jacket formed of a flexible material, the target article 9 may fall in the gap region G while being transported. Specifically, when passing through the gap region G, the target article 9 may be deformed so as to be bent downward by its own weight, thus falling in the gap region G. That is, it may not be possible to stably transport the article across the gap region G at the boundary between the inside and the outside of the communication area 2A. However, the article transport facility 100 according to the present embodiment is configured to enable the target article 9 to be stably transported at the boundary between the inside and the outside of the communication area 2A even when the target article 9 is an article having flexibility as described above. This will be described in detail below.

In the article transport facility 100, at least one of the intra-area transport unit 10 and the extra-area transport unit 11 is configured to be movable along the transport direction X. This allows the intra-area transport unit 10 and the extra-area transport unit 11 to move close to each other in the transport direction X, thus making it possible to temporarily reduce the size of the gap region G. In the present embodiment, the intra-area transport unit 10 is configured to be movable to both the transport direction upstream side Xu and the transport direction downstream side Xd along the transport direction X. This makes it possible to reduce the size of the gap region G on each of the transport direction upstream side Xu and the transport direction downstream side Xd of the communication area 2A as needed.

As shown in FIG. 3, in the present embodiment, the intra-area transport unit 10 includes a movable support portion 10c that supports a transport mechanism (the belt 10a and the pair of pulleys 10b in the present example) and that moves along the transport direction X, and a guide portion 10d that guides the movable support portion 10c along the transport direction X. In the illustrated example, the guide portion 10d is formed by a pair of rails extending along the transport direction X (see also FIG. 1).

In the present embodiment, the position of the extra-area transport unit 11 in the transport direction X is fixed. More specifically, the position of each of the upstream transport unit 11U and the downstream transport unit 11D in the transport direction X is fixed. As shown in FIG. 3, the upstream transport unit 11U includes an upstream fixed support part 11Uc that supports a transport mechanism (the belt 11Ua and the pair of pulleys 11Ub in the present example) and that is fixed to the floor surface F. The downstream transport unit 11D includes a downstream fixed support part 11Dc that supports a transport mechanism (the belt 11Da and the pair of pulleys 11Ub in the present example) and that is fixed to the floor surface F. In the illustrated example, the upstream fixed support part 11Uc and the downstream fixed support part 11Dc are each formed by a strut, for example.

As described above, in the present embodiment, the intra-area transport unit 10 is movable to both the transport direction upstream side Xu and the transport direction downstream side Xd. In the present example, the intra-area transport unit 10 is configured so as to be able to change its position to a reference position Ps, an upstream transport position Pu located on the transport direction upstream side Xu relative to the reference position Ps, and a downstream transport position Pd located on the transport direction downstream side Xd relative to the reference position Ps, by moving along the transport direction X.

The transport device 1 transports the target article 9 between the intra-area transport unit 10 and the extra-area transport unit 11, with the intra-area transport unit 10 located at the upstream transport position Pu or the downstream transport position Pd. In the following, a transport period Tt is a period during which a target article 9 is transported between the intra-area transport unit 10 and the extra-area transport unit 11, and a non-transport period Tn is a period during which the target article 9 is not transported between the intra-area transport unit 10 and the extra-area transport unit 11. A transport period Tt and a non-transport period Tn are concepts that can occur at the same time at locations that are different from each other. For example, during a transport period Tt during which the target article 9 is transported between the intra-area transport unit 10 and the upstream transport unit 11U, the intra-area transport unit 10 and the downstream transport unit 11D are in a non-transport period Tn during which the target article 9 is not transported therebetween.

Here, it is assumed that a second interval L2 is the length of a gap region G that enables the door member 221 to be disposed between the intra-area transport unit 10 and the extra-area transport unit 11. Also, a first interval L1 is a length of a gap region G that is shorter than the second interval L2, and that enables the target article 9 to be appropriately transported between the intra-area transport unit 10 and the extra-area transport unit 11. In the present example, the first interval L1 is an interval shorter than the thickness (the length in the transport direction X) of the door member 221. Preferably, the first interval L1 is a minimum interval without any interference between the transport mechanism of the intra-area transport unit 10 and the transport mechanism of the extra-area transport unit 11, for example.

As shown in FIGS. 1 to 3 and 5, in the present embodiment, the length of the gap region G between the intra-area transport unit 10 and the extra-area transport unit 11 is set to the second interval L2 in a state in which the intra-area transport unit 10 is located at the reference position Ps. In the present example, in a state in which the intra-area transport unit 10 is located at the reference position Ps, the length of the gap region G is set to the second interval L2 both between the intra-area transport unit 10 and the upstream transport unit 11U, and between the intra-area transport unit 10 and the downstream transport unit 11D.

Figure 4:
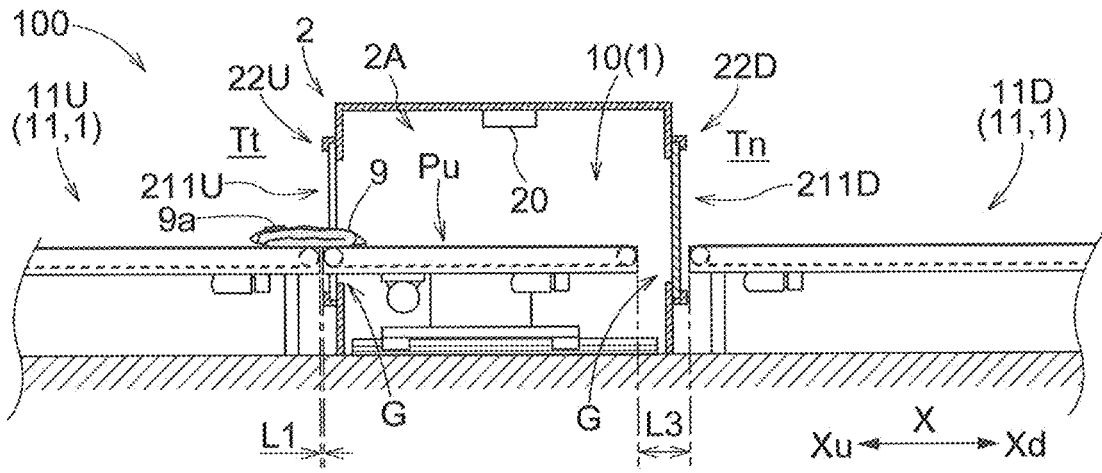
FIG. 4 is a diagram illustrating an operation performed when transporting a target article from the outside of a communication area to the inside thereof.

As shown in FIG. 4, the length of the gap region G between the intra-area transport unit 10 and the upstream transport unit 11U is set to the first interval L1 in a state in which the intra-area transport unit 10 is located at the upstream transport position Pu. In this state, the length of the gap region G between the intra-area transport unit 10 and the downstream transport unit 11D is set to be greater than or equal to the second interval L2. Here, the length is a third interval L3 that is longer than the second interval L2.

Figure 6:
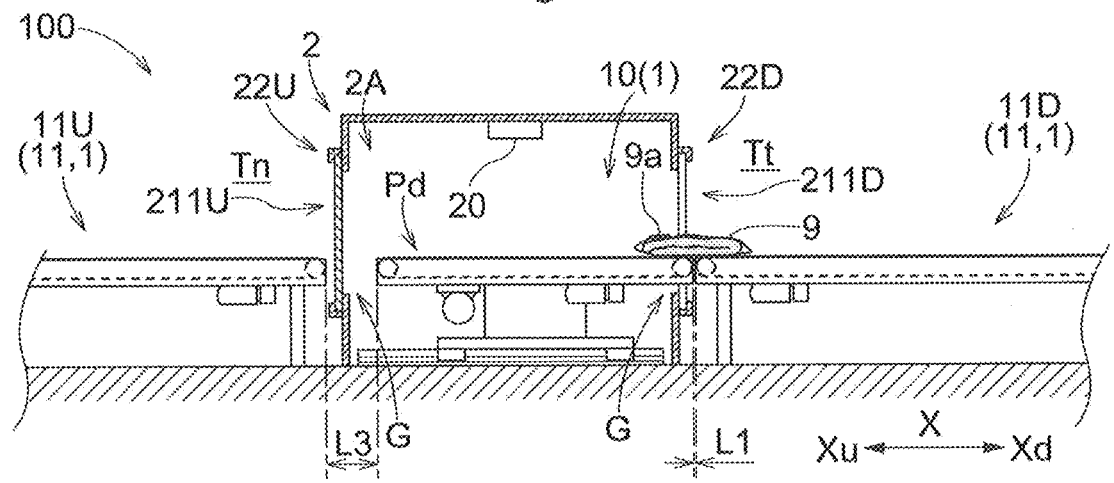
FIG. 6 is a diagram illustrating an operation performed when transporting the target article from the inside of the communication area to the outside thereof.

On the other hand, as shown in FIG. 6, the length of the gap region G between the intra-area transport unit 10 and the downstream transport unit 11D is set to the first interval L1 in a state in which the intra-area transport unit 10 is located at the downstream transport position Pd. In this state, the length of the gap region G between the intra-area transport unit 10 and the upstream transport unit 11U is set to be greater than or equal to the second interval L2. Here, the length is set to the third interval L3 that is longer than the second interval L2.

Figure 5:
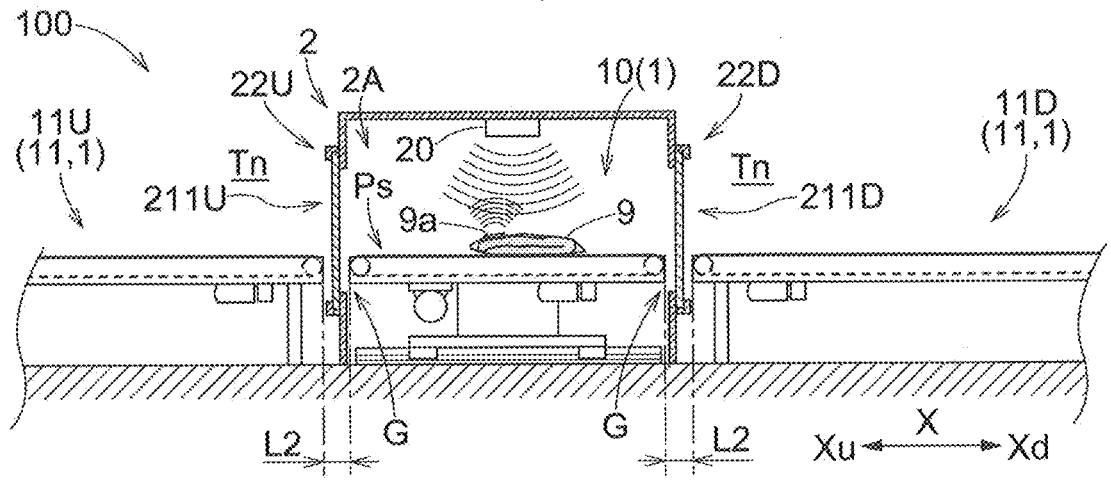
FIG. 5 is a diagram illustrating an operation performed when communicating with the target article inside the communication area.

As shown in FIGS. 4 to 6, during at least a part of the non-transport period Tn, the length in the transport direction X of the gap region G is set to be greater than or equal to the second interval L2, and the shield gate 22 is in the closed state. During the transport period Tt, the shield gate 22 is in the open state, and the length in the transport direction X of the gap region G is set to the first interval L1 that is shorter than the second interval L2. This enables the target article 9 to be transported between the intra-area transport unit 10 and the extra-area transport unit 11 across the gap region G even when the target article 9 is an article having flexibility. Thus, it is possible to stably transport the target article 9 at a boundary between the inside and the outside of the communication area 2A. Furthermore, during at least a part of the non-transport period Tn, the length in the transport direction X of the gap region G is set to be greater than or equal to the second interval L2, and the shield gate 22 is in the closed state. Accordingly, it is possible to ensure a period during which radio waves are less likely to leak between the inside and the outside of the communication area 2A, thus making it possible to favorably perform communication between the communication device 2 and the electronic tag 9a inside the communication area 2A within the ensured period.

In the state shown in FIG. 4, the transport period Tt occurs between the intra-area transport unit 10 and the upstream transport unit 11U, so that the upstream shield gate 22U is in the open state, and the length of the gap region G is set to the first interval L1. The non-transport period Tn occurs between the intra-area transport unit 10 and the downstream transport unit 11D, so that the length of the gap region G is set to the third interval L3, and the downstream shield gate 22D is in the closed state. That is, in the present example, when the upstream shield gate 22U is in the open state, the downstream shield gate 22D is in the closed state, and the length of the gap region G corresponding to the upstream shield gate 22U is set to the first interval L1. This makes it possible to stably transport the target article 9 between the intra-area transport unit 10 and the upstream transport unit 11U.

Next, as shown in FIG. 5, in the present embodiment, the communication device 2 wirelessly communicates with the electronic tag 9a, while both the upstream shield gate 22U and the downstream shield gate 22D are in the closed state. In the example shown in FIG. 5, the non-transport period Tn occurs both between the intra-area transport unit 10 and the upstream transport unit 11U, and between the intra-area transport unit 10 and the downstream transport unit 11D, so that the gap regions G are set to the second interval L2, and the upstream shield gate 22U and the downstream shield gate 22D are in the closed state. This can make radio waves less likely to leak between the inside and the outside of the communication area 2A, thus making it possible to favorably perform communication between the communication device 2 and the electronic tag 9a inside the communication area 2A.

Thereafter, the state shown in FIG. 6 is brought about. In this state, the transport period Tt occurs between the intra-area transport unit 10 and the downstream transport unit 11D, so that the downstream shield gate 22D is in the open state, and the length of the gap region G is set to the first interval L1. The non-transport period Tn occurs between the intra-area transport unit 10 and the upstream transport unit 11U, so that the length of the gap region G is set to the third interval L3, and the upstream shield gate 22U is in the closed state. That is, in the present example, when the upstream shield gate 22U is in the closed state, the downstream shield gate 22D is in the open state, and the length of the gap region G corresponding to the downstream shield gate 22D is set to the first interval L1. This makes it possible to stably transport the target article 9 between the intra-area transport unit 10 and the downstream transport unit 11D.

Control Configuration

Next, a control configuration of the article transport facility 100 will be described. As shown in FIG. 7, the article transport facility 100 includes a control device 3. The control device 3 includes, for example, a processor such as a microcomputer, and a peripheral circuit such as a memory. Various functions are implemented by these pieces of hardware working cooperatively with a program executed on a processor such as a computer.

The control device 3 is configured to be capable of wired or wireless communication with each of the transport device 1 and the communication device 2. In the present embodiment, the article transport facility 100 includes a sensor Se that detects the operation states of the facility. Also, the control device 3 is configured to be capable of obtaining information detected by the sensor Se.

In the present embodiment, the control device 3 separately controls the intra-area transport unit 10, the upstream transport unit 11U, and the downstream transport unit 11D. Each of the intra-area transport unit 10, the upstream transport unit 11U, and the downstream transport unit 11D includes its own control unit (not shown), and fine control of each of the transport units is performed by the control unit of its own.

In the present embodiment, the intra-area transport unit 10 includes an intra-area transport driving part 10mt that drives a transport mechanism (the belt 10a and the pair of pulleys 10b in the present example) for transporting the target article 9 along the transport direction X, and a slide driving part 10ms that slidingly moves the transport mechanism along the transport direction X. The upstream transport unit 11U includes an upstream transport driving part 11Um that drives a transport mechanism (the belt 11Ua and the pair of pulleys 11Ub in the present example) for transporting the target article 9 along the transport direction X. The downstream transport unit 11D includes a downstream transport driving part 11Dm that drives a transport mechanism (the belt 11Da and the pair of pulleys 11Db in the present example) for transporting the target article 9 along the transport direction X. These driving parts are each formed by a motor, for example.

In the present embodiment, the control device 3 separately controls the upstream shield gate 22U and the downstream shield gate 22D. Each of the upstream shield gate 22U and the downstream shield gate 22D includes its own control unit (not shown), and fine control of each of the gates is performed by the control unit of its own. In the present example, the upstream shield gate 22U includes an upstream gate driving part 22Um that drives the upstream door member 221U. The downstream shield gate 22D includes a downstream gate driving part 22Dm that drives the downstream door member 221D.

In the present embodiment, the sensor Se includes an upstream position sensor Se1 that detects the position of the target article 9 on the transport direction upstream side Xu relative to the communication area 2A, a downstream position sensor Se2 that detects the position of the target article 9 on the transport direction downstream side Xd relative to the communication area 2A, an upstream gate sensor Se3 that detects the open/closed state of the upstream shield gate 22U, a downstream gate sensor Se4 that detects the open/closed state of the downstream shield gate 22D, an upstream gate passage sensor Se5, and a downstream gate passage sensor Se6.

As shown in FIGS. 1 to 3, the upstream position sensor Se1 is provided so as to correspond to the upstream transport unit 11U, and detects that the target article 9 transported by the upstream transport unit 11U has reached a predetermined position. The downstream position sensor Se2 is provided so as to correspond to the downstream transport unit 11D, and detects that the target article 9 transported by the downstream transport unit 11D has reached a predetermined position. The upstream position sensor Se1 and the downstream position sensor Se2 are each formed, for example, by a photosensor that emits light and that detects the target article 9 as a result of the emitted light being blocked. However, the upstream position sensor Se1 and the downstream position sensor Se2 are not limited to such a configuration, and may be formed using, for example, a limit switch or any other known means capable of detecting the target article 9 transported on the transport surface Ft.

As shown in FIG. 3, the upstream gate sensor Se3 is provided so as to correspond to the upstream shield gate 22U, and detects the upstream door member 221U. In the present example, the upstream gate sensor Se3 separately detects that the upstream door member 221U is located at a position corresponding to the open state, and that the upstream door member 221U is located at a position corresponding to the closed state. The downstream gate sensor Se4 is provided so as to correspond to the downstream shield gate 22D, and detects the downstream door member 221D. In the present example, the downstream gate sensor Se4 separately detects that the downstream door member 221D is located at a position corresponding to the open state, and that the downstream door member 221D is located at a position corresponding to the closed state. The upstream gate sensor Se3 and the downstream gate sensor Se4 are each formed, for example, by a photosensor that emits light and that detects the door member 221 and the target article 9 as a result of the emitted light being blocked. However, the upstream gate sensor Se3 and the downstream gate sensor Se4 are not limited to such a configuration, and may be formed using, for example, a limit switch or any other known means capable of detecting the door member 221 moving along the opening 211, and the target article 9 passing through the opening 211.

The upstream gate passage sensor Se5 is provided so as to correspond to the upstream opening 211U, and detects that the target article 9 has passed through the upstream opening 211U. The downstream gate passage sensor Se6 is provided so as to correspond to the downstream opening 211D, and detects that the target article 9 has passed through the downstream opening 211D. The upstream gate passage sensor Se5 and the downstream gate passage sensor Se6 are each formed, for example, by a photosensor that emits light and that detects the passage of the target article 9 as a result of the emitted light having been blocked being later no longer blocked. However, the upstream gate passage sensor Se5 and the downstream gate passage sensor Se6 are not limited to such a configuration, and may be formed using, for example, a limit switch or any other known means capable of detecting the target article 9 transported on the transport surface Ft.

In the present embodiment, when the target article 9 is detected by the upstream position sensor Se1, the control device 3 brings the upstream shield gate 22U into the open state, and causes the intra-area transport unit 10 to move to the upstream transport position Pu (see FIG. 4). This brings about a state in which the target article 9 can be transported between the upstream transport unit 11U and the intra-area transport unit 10.

In the present embodiment, when the upstream gate sensor Se3 detects that the target article 9 has passed through the upstream opening 211U, the control device 3 causes the intra-area transport unit 10 to move to the reference position Ps, and brings the upstream shield gate 22U into the closed state (see FIG. 5). On the conditions that the upstream gate sensor Se3 detects that the upstream shield gate 22U is in the closed state, and that the downstream gate sensor Se4 detects that the downstream shield gate 22D is in the closed state, the control device 3 causes the communication device 2 to communicate with the electronic tag 9a, and reads the attribute information from the electronic tag 9a. This enables favorable communication between the communication device 2 and the electronic tag 9a, with the inside and the outside of the communication area 2A shielded from each other.

In the present embodiment, after communication has been performed between the communication device 2 and the electronic tag 9a, the control device 3 brings the downstream shield gate 22D into the open state, and causes the intra-area transport unit 10 to move to the downstream transport position Pd (see FIG. 6). This brings about a state in which the target article 9 can be transported between the intra-area transport unit 10 and the downstream transport unit 11D.

In the following, a procedure of control performed by the article transport facility 100 will be described with reference to FIG. 8.

In the article transport facility 100, first, whether or not the target article 9 has reached the upstream transport unit 11U is determined (step #1). This determination is made based on a result of detection performed by the upstream position sensor Se1. If it is determined that the target article 9 has not reached the upstream transport unit 11U (step #1: No), step #1 is repeatedly executed. If it is determined that the target article 9 has reached the upstream transport unit 11U (step #1: Yes), the upstream shield gate 22U is brought into the open state (step #2), and the intra-area transport unit 10 is caused to be located at the upstream transport position Pu (step #3).

Thereafter, whether or not the target article 9 has reached inside the communication area 2A through the upstream opening 211U is determined (step #4). This determination is made based on a result of detection performed by the upstream gate passage sensor Se5. If it is determined that the target article 9 has not reached inside the communication area 2A (step #4: No), step #4 is repeatedly executed. If it is determined that the target article 9 has reached inside the communication area 2A (step #4: Yes), the intra-area transport unit 10 is moved to the reference position Ps (step #5), and the upstream shield gate 22U is brought into the closed state (step #6). Next, whether or not the downstream shield gate 22D, which is the shield gate 22 on the other side, is in the closed state (step #7). If it is determined that the downstream shield gate 22D is not in the closed state, or in other words, if it is determined that the downstream shield gate 22D is in the open state (step #7: No), the downstream shield gate 22D is brought into the closed state (step #8).

If it is determined that both the upstream shield gate 22U and the downstream shield gate 22D are in the closed state, communication with the electronic tag 9a attached to the target article 9 is performed using the communication device 2 (step #9). By doing so, the attribute information is read from the electronic tag 9a. After completion of the communication, the downstream shield gate 22D is brought into the open state (step #10), and the intra-area transport unit 10 is caused to be located at the downstream transport position Pd (step #11).

Thereafter, whether or not the target article 9 has reached the downstream transport unit 11D through the downstream opening 211D is determined (step #12). This determination is made based on a result of detection performed by at least one of the downstream gate passage sensor Se6 and the downstream position sensor Se2. If it is determined that the target article 9 has not reached the downstream transport unit 11D (step #12: No), step #12 is repeatedly executed. If it is determined that the target article 9 has reached the downstream transport unit 11D (step #12: Yes), the intra-area transport unit 10 is caused to be located at the reference position Ps (step #13), and the downstream shield gate 22D is brought into the closed state (step #14).

Other Embodiments

Next, other embodiments of the article transport facility will be described.

(1) The above embodiment describes an example in which the intra-area transport unit 10 is configured to be movable along the transport direction X, and the position of the extra-area transport unit 11 in the transport direction X is fixed. However, the present disclosure is not limited to such an example. Alternatively or additionally to the intra-area transport unit 10, the extra-area transport unit 11 may be configured to be movable along the transport direction X. For example, in the case where the position of the intra-area transport unit 10 in the transport direction X is fixed, and the extra-area transport unit 11 is configured to be movable along the transport direction X, during the transport period Tt, the shield gate 22 is in the open state, and the extra-area transport unit 11 moves in a direction toward the intra-area transport unit 10, so that the length in the transport direction X of the gap region G between the extra-area transport unit 11 and the intra-area transport unit 10 is set to the first interval L1 that is shorter than the second interval L2. For example, in the case where both the intra-area transport unit 10 and the extra-area transport unit 11 are configured to be movable along the transport direction X, during the transport period Tt, the shield gate 22 is in the open state, and both the extra-area transport unit 11 and the intra-area transport unit 10 move in a direction toward each other, so that the length in the transport direction X of the gap region G between the extra-area transport unit 11 and the intra-area transport unit 10 is set to the first interval L1 that is shorter than the second interval L2.

(2) The above embodiment describes an example in which both the intra-area transport unit 10 and the extra-area transport unit 11 are formed by a belt conveyor. However, the present disclosure is not limited to such an example. These transport units may be formed by other known transporting means. For example, at least one of the intra-area transport unit 10 and the extra-area transport unit 11 may be formed by a roller conveyor.

(3) The above embodiment describes an example in which the door member 221 is configured to move along the width direction Y. However, the present disclosure is not limited to such an example. The door member 221 may be configured to move along a direction different from the width direction Y, for example, the up-down direction, or may be configured to swing using a hinge. The above embodiment describes an example in which the door member 221 is formed by a pair of plate-shaped members disposed side by side in the width direction Y. However, the present disclosure is not limited to such an example. The door member 221 may be formed by one plate-shaped member, for example.

(4) The above embodiment describes an example in which the upstream shield gate 22U and the downstream shield gate 22D have the same configuration. However, the present disclosure is not limited to such an example. The upstream shield gate 22U and the downstream shield gate 22D may have structures different from each other. For example, one of the upstream shield gate 22U and the downstream shield gate 22D may include a door member 221 that moves along the width direction Y, and the other may include a door member 221 that moves along the up-down direction.

(5) Note that the configurations disclosed in the embodiments described above are applicable in combination with configurations disclosed in other embodiments as long as no inconsistency arises. With regard to the other configurations as well, the embodiments disclosed herein are illustrative in all respects. Therefore, various modifications and alterations may be made as appropriate without departing from the gist of the present disclosure.

Outline of the Embodiment

An outline of the article transport facility described above will be described below.

An article transport facility includes:
a transport device that transports a target article to which an electronic tag for contactless communication is attached, that includes a transport surface on which the target article is to be placed, and that transports the target article along a predetermined transport direction; and
a communication device installed in a communication area that is set in a part of a transport path along which the target article is transported, and including a wireless radio that wirelessly communicates with the electronic tag,
wherein the transport device includes an intra-area transport unit provided inside the communication area, and an extra-area transport unit provided outside the communication area and disposed side by side with the intra-area transport unit along the transport direction,
the communication device includes a shield wall installed so as to surround the communication area, and having an opening formed in a portion thereof corresponding to the transport path, and a shield gate that opens and closes the opening,
the shield gate includes a door member that is disposed in a gap region located between the intra-area transport unit and the extra-area transport unit in the transport direction in a closed state in which the shield gate shields the opening, and is disposed at a position displaced from the gap region in an open state in which the shield gate opens the opening,
at least one of the intra-area transport unit and the extra-area transport unit is configured to be movable along the transport direction,
assuming that a second interval is a length of the gap region that allows the door member to be disposed between the intra-area transport unit and the extra-area transport unit, a transport period is a period during which the target article is transported between the intra-area transport unit and the extra-area transport unit, and a non-transport period is a period during which the target article is not transported between the intra-area transport unit and the extra-area transport unit,
during at least a part of the non-transport period, a length in the transport direction of the gap region is set to be greater than or equal to the second interval, and the shield gate is in the closed state, and,
during the transport period, the shield gate is in the open state, and a length in the transport direction of the gap region is set to a first interval that is shorter than the second interval.

With this configuration, during the transport period during which the target article is transported between the intra-area transport unit and the extra-area transport unit, the length in the transport direction of the gap region located between the intra-area transport unit and the extra-area transport unit is set to the first interval that is shorter than the second interval that allows the door member to be disposed between the intra-area transport unit and the extra-area transport unit. Accordingly, even in the case where the target article is an article having flexibility, or where the second interval is long relative to the size of the article, it is possible to stably transport the target article between the intra-area transport unit and the extra-area transport unit across the gap region having the first interval shorter than the second interval. Thus, it is possible to stably transport the article at the boundary between the inside and the outside of the communication area. With this configuration, during at least a part of the non-transport period, the length in the transport direction of the gap region is set to be greater than or equal to the second interval, and the shield gate is in the closed state. Accordingly, it is possible to ensure a period during which radio waves are less likely to leak between the inside and the outside of the communication area, thus making it possible to favorably perform communication between the communication device and the electronic tag inside the communication area within the ensured period.

Here, it is preferable that
the extra-area transport unit includes an upstream transport unit disposed side by side with the intra-area transport unit on an upstream side of the transport direction, and a downstream transport unit disposed side by side with the intra-area transport unit on a downstream side of the transport direction,
the opening incudes an upstream opening provided upstream of the communication area, and a downstream opening provided downstream of the communication area,
the shield gate includes an upstream shield gate that opens and closes the upstream opening, and a downstream shield gate that opens and closes the downstream opening, and
the intra-area transport unit is configured to be movable to both upstream and downstream sides along the transport direction, and positions in the transport direction of the upstream transport unit and the downstream transport unit are fixed.

With this configuration, only the intra-area transport unit, out of the upstream transport unit, the downstream transport unit, and the intra-area transport unit, is configured to be movable along the transport direction, whereby each of the gap region between the intra-area transport unit and the upstream transport unit, and the gap region between the intra-area transport unit and the downstream transport unit can be changed to the first interval as needed. Thus, with this configuration, it is possible to reduce the number of transport units that are to be configured to be movable. Accordingly, an article transport facility capable of stably transporting the target article in the gap regions on both the upstream and downstream sides of the transport direction relative to the communication area can be realized with a relatively simple configuration.

It is preferable that,
when the upstream shield gate is in the open state, the downstream shield gate is in the closed state, and a length of the gap region corresponding to the upstream shield gate is set to the first interval, and,
when the downstream shield gate is in the open state, the upstream shield gate is in the closed state, and a length of the gap region corresponding to the downstream shield gate is set to the first interval.

With this configuration, when the upstream shield gate is in the open state, the length of the gap region corresponding to the upstream shield gate is set to the first interval. Thus, the target article can be appropriately transported (loaded) to the inside of the communication area from the outside thereof. Also, in the above-described case, the downstream shield gate is in the closed state, whereby preparation for wireless communication with the electronic tag attached to the target article can be performed promptly. Accordingly, the cycle time can be easily improved. With this configuration, when the downstream shield gate is in the open state, the upstream shield gate is in the closed state, and the length of the gap region corresponding to the downstream shield gate is set to the first interval. Thus, on the downstream side in the transport direction of the communication area, the target article can be appropriately transported (unloaded) to the outside of the communication area from the inside thereof. On the upstream side in the transport direction of the communication area, the possibility that the subsequently transported target article will fall in the gap region can be reduced since the upstream shield gate is in the closed state despite that the length of the gap region is at least the second interval or longer, i.e., wider.

It is preferable that
the communication device wirelessly communicates with the electronic tag while both the upstream shield gate and the downstream shield gate are in the closed state.

With this configuration, leakage of radio waves between the inside and the outside of the communication area can be effectively suppressed, thus making it possible to favorably perform communication between the communication device and the electronic tag inside the communication area.

INDUSTRIAL APPLICABILITY

The technique according to the present disclosure is applicable to an article transport facility.

DESCRIPTION OF REFERENCE SIGNS

100: Article transport facility
1: Transport device
10: Intra-area transport unit
11: Extra-area transport unit
11D: Downstream transport unit
11U: Upstream transport unit
2: Communication device
2A: Communication area
20: Wireless radio
21: Shield wall
22: Shield gate
22D: Downstream shield gate
22U: Upstream shield gate
211: Opening
211D: Downstream opening
211U: Upstream opening
221: Door member
221D: Downstream door member
221U: Upstream door member
9: Target article
9a: Electronic tag
Ft: Transport surface
G: Gap region
L1: First interval
L2: Second interval
R: Transport path
Tn: Non-transport period
Tt: Transport period
X: Transport direction
Xd: Transport direction downstream side
Xu: Transport direction upstream side
Y: Width direction

The invention claimed is:

1. An article transport facility comprising:
a transport device that transports a target article to which an electronic tag for contactless communication is attached, has a transport surface on which the target article is placeable, and transports the target article in a predetermined transport direction; and
a communication device installed in a communication area set at a part of a transport path along which the target article is transported and comprising a wireless radio that wirelessly communicates with the electronic tag,
the transport device comprising an intra-area transport unit provided inside the communication area and an extra-area transport unit provided outside the communication area and disposed next to the intra-area transport unit in the transport direction,
the communication device comprising:
a shield wall surrounding the communication area and having at least one opening at a portion thereof corresponding to the transport path; and
at least one shield gate that exposes and shields the at least one opening,
wherein:
the at least one shield gate includes a door member configured to be (i) in a gap region between the intra-area transport unit and the extra-area transport unit in the transport direction in a closed state in which the at least one shield gate shields the at least one opening and (ii) outside the gap region in an open state in which the at least one shield gate opens the at least one opening,
at least either the intra-area transport unit or the extra-area transport unit is movable in the transport direction,
with (i) a second interval being a length of the gap region that allows the door member to be between the intra-area transport unit and the extra-area transport unit, (ii) a transport period being a period during which the target article is transported between the intra-area transport unit and the extra-area transport unit, and (iii) a non-transport period being a period during which the target article is not transported between the intra-area transport unit and the extra-area transport unit,
during at least a part of the non-transport period, the gap region has in the transport direction a length greater than or equal to the second interval, and the-at least one shield gate is in the closed state, and,
during the transport period, the respective shield gate is in the open state, and the gap region has in the transport direction a length of a first interval shorter than the second interval,
wherein the extra-area transport unit comprises:
an upstream transport unit disposed next to the intra-area transport unit on an upstream side of the transport direction; and
a downstream transport unit disposed next to the intra-area transport unit on a downstream side of the transport direction,
wherein the at least one opening comprises:
an upstream opening provided upstream of the communication area; and
a downstream opening provided downstream of the communication area, wherein the at least one shield gate comprises:
- an upstream shield gate that exposes and shields the upstream opening; and
- a downstream shield gate that exposes and shields the downstream opening, and wherein the intra-area transport unit is movable to both upstream and downstream sides in the transport direction, wherein, when the upstream shield gate is in the open state, the downstream shield gate is in the closed state, and the gap region corresponding to the upstream shield gate has a length of the first interval, and, wherein when the downstream shield gate is in the open state, the upstream shield gate is in the closed state, and the gap region corresponding to the downstream shield gate has a length of the first interval.

2. The article transport facility according to claim 1,
wherein the communication device wirelessly communicates with the electronic tag while both the upstream shield gate and the downstream shield gate are in the closed state.

* * * * *

UNITED STATES PATENT AND TRADEMARK OFFICE
CERTIFICATE OF CORRECTION

PATENT NO. : 12,006,158 B2
APPLICATION NO. : 17/639491
DATED : June 11, 2024
INVENTOR(S) : Masaya Miyamoto et al.

It is certified that error appears in the above-identified patent and that said Letters Patent is hereby corrected as shown below:

In the Claims

Column 18, Line 50, Claim 1, delete "the-at" and insert -- the at --

Signed and Sealed this
Twenty-seventh Day of August, 2024

Katherine Kelly Vidal
*Director of the United States Patent and Trademark Office*